US005322978A

United States Patent [19]
Protheroe et al.

[11] Patent Number: 5,322,978
[45] Date of Patent: Jun. 21, 1994

[54] HANDWRITING CAPTURE DEVICE WITH INTEGRAL FORMS PRINTER

[75] Inventors: Robert L. Protheroe, Lawrenceville; Scott M. Klement, Duluth, both of Ga.

[73] Assignee: NCR Corporation, Dayton, Ohio

[21] Appl. No.: 3,378

[22] Filed: Jan. 12, 1993

[51] Int. Cl.$^5$ .............................................. G08C 21/00
[52] U.S. Cl. .................................... 178/18; 178/19; 178/23 R; 345/174
[58] Field of Search .................. 178/18, 19, 20, 87, 178/23 R; 345/156, 168, 169, 173, 174

[56] References Cited

U.S. PATENT DOCUMENTS

| | | | |
|---|---|---|---|
| 3,128,340 | 4/1964 | Harmon | 178/18 |
| 3,475,554 | 10/1969 | Vaneda | 178/18 |
| 3,480,911 | 11/1969 | Danna | 340/146.3 |
| 4,262,281 | 4/1981 | Buckle et al. | 178/18 X |
| 4,679,241 | 7/1987 | Lukis | 382/13 |
| 4,817,034 | 3/1989 | Hardin, Sr. et al. | 178/18 X |
| 5,049,862 | 9/1991 | Dao et al. | 345/169 |
| 5,120,906 | 6/1992 | Protheroe et al. | 178/18 |

*Primary Examiner*—Stephen Chin
*Assistant Examiner*—Paul Loomis
*Attorney, Agent, or Firm*—Paul W. Martin

[57] ABSTRACT

A handwriting capture device which includes an integral printer for printing forms and for feeding the forms over a digitizer for signature by a customer. The handwriting capture device employs a highly sensitive digitizer to accurately capture signature information entered using a writing force greater than or equal to a predetermined writing force. The handwriting capture device includes a housing having a top surface, a resistive membrane digitizer mounted in the top surface, circuitry for processing digitizer information and for controlling operation of the printer, and a clamp for retaining a receipt in place over the digitizer during movement of the device. The clamp also serves to minimize finger contact with the digitizer.

33 Claims, 3 Drawing Sheets

HANDWRITING CAPTURE DEVICE WITH INTEGRAL FORMS PRINTER

CROSS REFERENCE TO RELATED APPLICATIONS

The present invention is related to the following commonly assigned U.S. applications:

"Write Input Transaction Apparatus and Method", filed Aug. 30, 1990, invented by Allgeier et al., and having a U.S. Pat. No. 07/575,096 (currently pending); and "Handwriting Capture Device", U.S. Pat. No. 5,120,906, issued Jun. 9, 1992, to Protheroe et. al.

BACKGROUND OF THE INVENTION

The present invention relates to handwriting capture devices and printers, and more specifically to a handwriting capture device with integral forms printer.

A common task is to print a form and then write information on or sign the form. For example, it is common to print information on and sign a credit receipt. Multiple copies of such forms are usually required. Thus, it is generally desirable to capture the handwriting or signature in digital form, so as to provide a paper copy and an electronic copy of the record of the transaction. In the case of credit receipts, a customer takes the paper copy and a retail or financial network processes the electronic copy.

In commonly-assigned U.S. Pat. No. 5,120,906 to Protheroe et. al., a handwriting capture device having a retention mechanism to hold and orient a form above the handwriting capture element is disclosed. An operator inserts and aligns a credit receipt into the handwriting capture device. While the customer signs the receipt the handwriting capture device captures the signature in digital representation. This patent is hereby incorporated by reference.

Two problems that often occur in completing such transactions relate to the act of placing the printed form on the handwriting capture device. One problem is that this task is time consuming and requires operator care in proper orientation and placement of the printed form over the capture mechanism. The other problem is that if misorientation occurs, the electronic copy or the system obtaining the electronic copy has to compensate for any misorientation of the form relative to the capture mechanism. Otherwise the resultant image will inaccurately show the position of the handwriting or signature on the form.

Therefore, it would be desirable to provide a handwriting capture device with an integral forms printer, which creates a form and orients it over the handwriting capture element, thereby providing proper and automatic orientation of the form relative to the handwriting capture device.

SUMMARY OF THE INVENTION

In accordance with the teachings of the present invention, a handwriting capture device with an integral forms printer is provided. The handwriting capture device includes a housing having a top surface, a pressure-sensitive digitizer mounted in the top surface, a forms printer for storing and printing paper receipts, circuitry for processing signature information from the digitizer and for controlling operation of the forms printer, and a clamp for retaining the lead receipt of a roll of receipts in place over the digitizer. In the preferred embodiment, the clamp also serves to minimize finger contact with the digitizer.

It is accordingly an object of the present invention to provide a handwriting capture device with and integral forms printer.

It is another object of the present invention to provide a handwriting capture device which employs a clamp for holding a printed receipt from the forms printer in place over the digitizer for signature.

It is another object of the present invention to provide a handwriting capture device which employs a clamp for holding a printed receipt from the forms printer in place over the digitizer for signature and which minimizes finger contact with the digitizer.

It is another object of the present invention to provide a handwriting capture device which is lightweight, hand-held, and portable.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
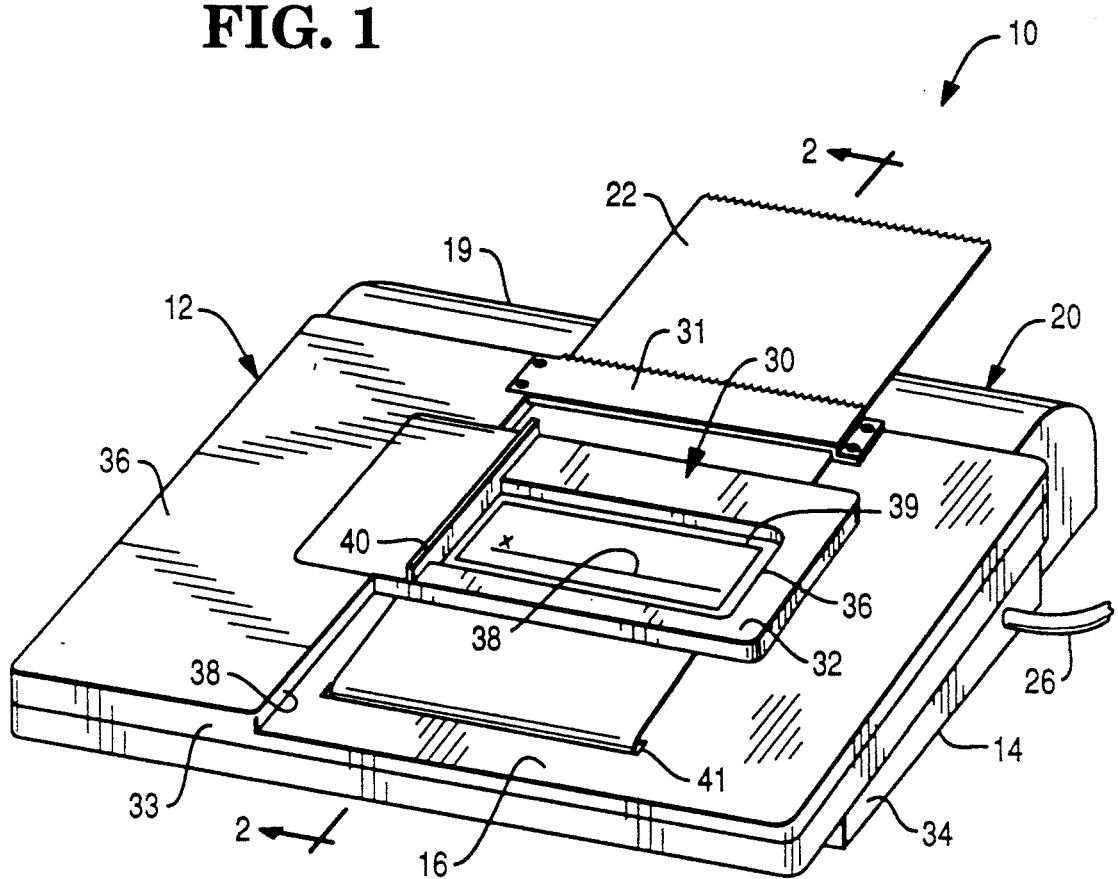
FIG. 1 is a perspective view of the handwriting capture device of the present invention.
Figure 2:
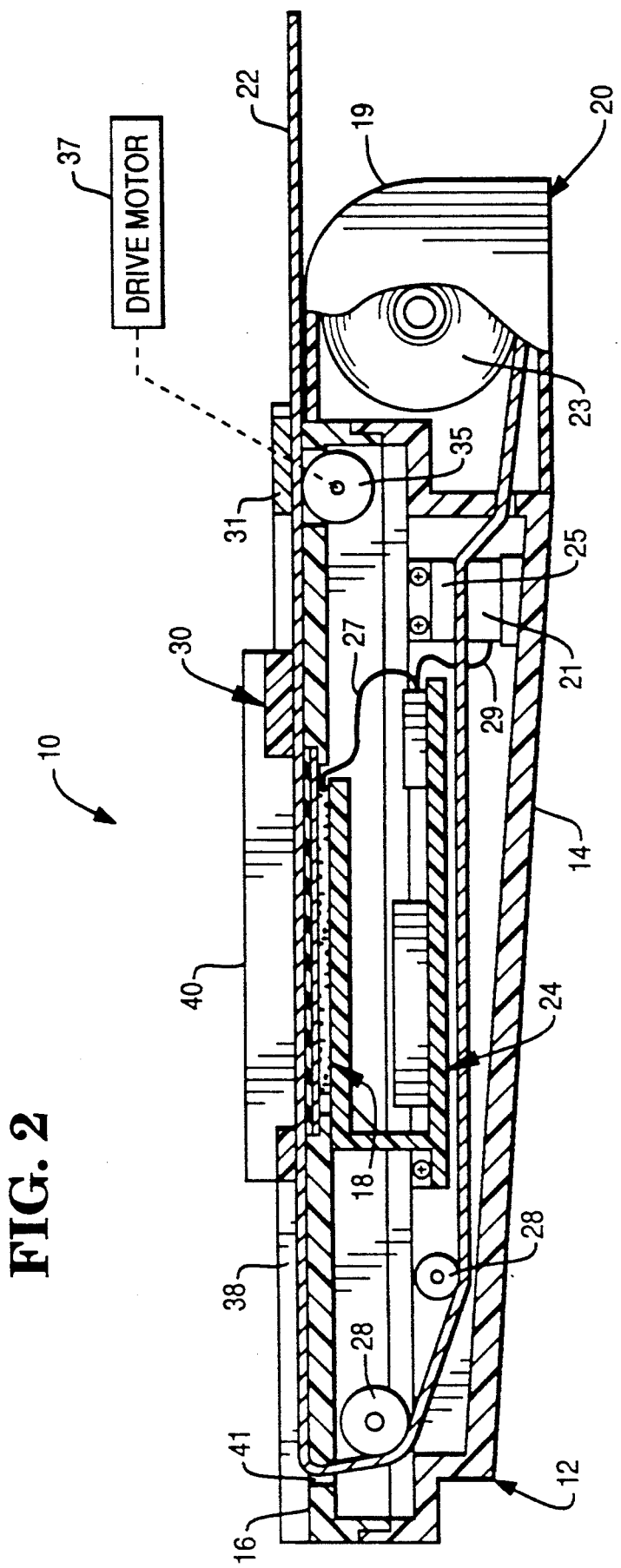
FIG. 2 is a sectional view of the handwriting capture device of FIG. 1 taken along line 5—5 of FIG. 1.

Turning now to FIGS. 1 and 2, a first embodiment of the handwriting capture device 10 of the present invention is shown. The handwriting capture device 10 includes a housing 12 having a bottom supporting surface 14 and a top surface 16. In this embodiment, the housing 12 is generally rectangular in shape. The handwriting capture device 10 is lightweight and portable. The left end of the housing 12 is sufficient in width and depth to facilitate grasping of the housing 12.

Within the top surface 16 is a pressure-sensitive digitizer 18, although other types of digitizers are also envisioned. Digitizer 18 is sensitive to signing forces greater than or equal to a predetermined minimum signing force, which is no more than about b 10 to 15 grams. When a pen is used, digitizer 18 has a sensitivity sufficient to capture a handwriting that produces a legible ink impression on the receipt. In this embodiment, a digitizer manufactured by W. H. Brady & Co. and having a part number 2500044089 is used. This digitizer has a near separation between dots of 0.2 inches. Dot separations higher than 0.2 are not recommended because spurious digitizer readings are more likely to occur. Digitizers having dot separations as low as 0.16 inches may be used in the present invention to achieve valid handwriting capture.

Printer 20 prints record member 22, and includes roll housing 19, print head 21, platen 25, rollers 28, cutter 31, capstan drive roller 35, and capstan roller drive motor 37. Receipt 22 is one of many receipts gathered in a roll 23 within roll housing 19. Receipt 22 is fed between printhead 21 and platen 25, around rollers 28, through slot 41 in top surface 16, along guide surface 38 and under clamp 32, and between cutter 31 and capstan drive roller 35. Capstan drive roller 35 is biased against cutter 31 so as to pull receipt 22 over digitizer 18. Motor 37 may be energized by print or line feed keys on device 10 or on the POS terminal for a predetermined time which is sufficient to accurately align receipt 22 over digitizer 18 for signing, and to feed a previously signed receipt to cutter 31 for removal.

Also within the housing 12 is electronic processing circuitry 24 for operating the digitizer 18, for controlling information flow from the digitizer 18 to a point-of-service (POS) terminal, and for controlling operation of printer 20. Electronic circuitry 24 is coupled to the POS terminal by a wire cable 26. Electronic processing circuitry 24 is coupled to the digitizer 18 through a wire connector 27 and to printer 20 through wire connector 29.

Paper receipt 22 from printer 20 is properly aligned and held in place during movement or the device 10 by clamp 30 for retaining receipt 22 in place during movement of device 10. Clamp 30 includes a frame member 32 which is generally rectangular in shape and which is made of transparent plastic to allow a customer to view the itemized information on receipt 22 while signing. Clamp 30 is anchored at its left end and its right end is biased against top surface 16 of housing 12. Centrally located within clamp 30 is a rectangular window 36 exposing digitizer 18 below. Window 36 serves to quickly orient a customer with the correct line 38 and area 39 for signing.

In addition, the housing 12 includes a top member 33 and a base member 34 which is inclined to facilitate writing. In order to properly align a receipt 22 for signature, the housing 12 includes a guide member 36 on the top surface 16 at one end of the housing 12. The guide member 36 has a vertical guide surface 38 against which the receipt 22 is aligned. The housing 12 is sufficient in width and depth to facilitate grasping of the housing 12.

Advantageously, clamp 30 also serves to minimize finger contact with digitizer 18. Clamp 30 includes a vertical rib 40 extending across clamp 30 for guarding digitizer 18 from the thumb of the left hand of a customer writing with his right hand and also restricts access to the digitizer 18 by a customer writing with his left hand. Frame member 32 blocks contact with digitizer 18 by the right hand. In addition, window 36 provides insufficient room for finger placement, forcing finger placement on the pen to be a predetermined distance upwards from the pen tip for both right and left-handed customers.

Figure 3:
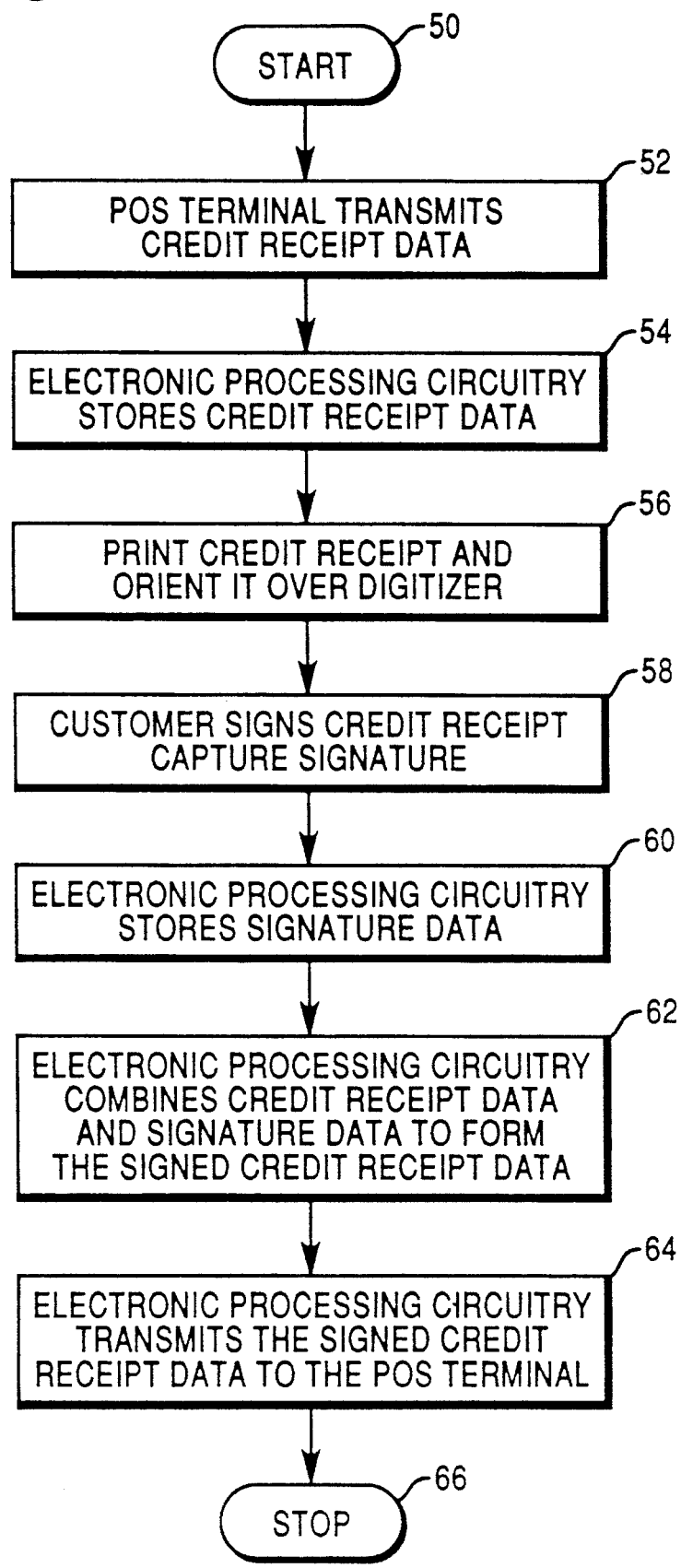
FIG. 3 is a flow diagram illustrating the combined operation of the handwriting capture device and forms printer.

Referring now to FIG. 3, a flow diagram of a forms printing and handwriting capture operation is shown, beginning with START 50.

In block 52 POS terminal 18 transmits credit receipt data in digital form to electronic processing circuitry 24 via wire cable 26.

In block 54, electronic processing circuitry 24 stores the digital credit receipt data.

In block 56, printer 20 prints and orients the credit receipt 22 over digitizer 18 in response to signals received from electronic processing circuitry 24.

In block 58 the customer signs the credit receipt 22. Digitizer 18 and electronic processing circuitry 24 capture the customer's signature in digital form.

In block 60 electronic processing circuitry 24 stores the signature in digital form.

In block 62 electronic processing circuitry 24 combines the digital credit receipt data and the digital signature data to form the electronic copy of the signed credit receipt.

In block 64 electronic processing circuitry 24 transmits the electronic copy of the signed credit receipt 22 to the POS terminal via wire cable 26.

In block 66 the method terminates.

Although the present invention has been described with particular reference to certain preferred embodiments thereof, variations and modifications of the present invention can be effected within the spirit and scope of the following claims.

What is claimed is:

1. A handwriting capture device comprising:
   a housing having a top surface;
   a digitizer, mounted within the top surface;
   a printer attached to the housing for printing a form including means for feeding the form to a predetermined position over the digitizer so that information written on the form is also entered into the digitizer; and
   means coupled to the digitizer for processing the written information and for controlling operation of the printer.

2. The handwriting capture device as recited in claim 1, further comprising:
   retaining means for holding the form in the predetermined position on the top surface.

3. The handwriting capture device as recited in claim 1, wherein the digitizer is a pressure-sensitive digitizer.

4. The handwriting capture device as recited in claim 2, wherein the digitizer is sensitive to a signing force greater than or equal to a predetermined minimum signing force from a writing instrument applied to a record member over the digitizer.

5. The handwriting capture device as recited in claim 1, wherein the retaining means comprises a clamp for holding a record member in place during movement of the device.

6. The handwriting capture device as recited in claim 1, further comprising a guard for minimizing finger contact with the digitizer.

7. The handwriting capture device as recited in claim 1, further comprising a guide for aligning an edge of the record member.

8. The handwriting capture device as recited in claim 1, wherein the housing comprises:
   a top member; and
   an inclined base member underneath the top member.

9. The handwriting capture device as recited in claim 5, wherein the clamp has a window over the digitizer.

10. The handwriting capture device as recited in claim 5, wherein the clamp comprises:
    a frame member; and
    a window within the frame member and over the digitizer.

11. The handwriting capture device as recited in claim 10, wherein the clamp is transparent.

12. The handwriting capture device as recited in claim 6, wherein the guard comprises:
    a frame member around the digitizer; and
    a vertical rib member mounted across the frame member.

13. The handwriting capture device as recited in claim 5, wherein the clamp is operative to hold the record member in place on the top surface of the housing.

14. The handwriting capture device as recited in claim 5, wherein the clamp is also operative to minimize finger contact with the digitizer.

15. The handwriting capture device of claim 2, wherein the digitizer has a near separation between dots of about 0.16 to 0.2 inches.

16. The handwriting capture device as recited in claim 3, wherein the minimum signing force is no more than about 10 to 15 grams.

17. The handwriting capture device as recited in claim 2, wherein the digitizer has a sensitivity sufficient to capture handwriting that produces a legible ink impression on the record member.

18. The handwriting capture device as recited in wherein the printer further comprises:
   a printhead; and
   means for feeding a roll of paper over the printhead for creating a plurality of forms and for feeding the forms one at a time over the digitizer.

19. The handwriting capture device as recited in claim 18, wherein the feeding means comprises:
   a stationary member mounted on top of the housing having a lower surface;
   a roller within the housing and biased against the lower surface of the stationary member for drawing the forms between the roller and the stationary member;
   a motor for driving the roller; and
   a raised portion on top of the housing, having a substantially vertical edge adjacent the digitizer against which the forms are aligned.

20. A handwriting capture device comprising:
   a housing having a top surface;
   a pressure sensitive digitizer, mounted within the top surface, having a near separation distance between dots of about 0.16 to 0.2 inches, and being sensitive to a predetermined minimum writing force of no more than about 10 to 15 grams from an ordinary writing instrument applied to a paper receipt over the digitizer;
   a printer coupled to the housing for printing a plurality of paper receipts from a roll of paper within the housing, including a printhead and means for feeding each paper receipt across the printhead and over the digitizer;
   a guide for aligning each paper receipt in a predetermined position over the digitizer;
   means coupled to the digitizer and mounted within the housing for processing signature information and for controlling the printer; and
   means for holding each receipt in place over the digitizer on the top surface and for guarding the digitizer from finger contact including a transparent frame member, a window within the frame member over the digitizer, and a vertical rib member mounted across the frame member, said holding and guarding means being operative to hold the receipt in place on the top surface of the housing.

21. A method for completing a transaction comprising the steps of:
   printing a record member with a printer;
   feeding the record member onto a writing surface adjacent the printer, the writing surface including a digitizer;
   applying a writing to the digitizer through the record member; and
   processing a signal representing the writing from the digitizer.

22. The method as recited in claim 21, wherein the writing surface further comprises retaining means for holding the record member in a predetermined position on the top surface.

23. The method as recited in claim 21, wherein the digitizer is a pressure-sensitive digitizer.

24. The method as recited in claim 23, wherein the digitizer is sensitive to a writing force greater than or equal to a predetermined minimum writing force.

25. The method as recited in claim 24, wherein the minimum writing force is no more than about 10 to 15 grams.

26. The method as recited in claim 23, wherein the digitizer has a near separation distance between dots of about 0.16 to 0.2 inches.

27. The method as recited in claim 23, wherein the digitizer has a sensitivity sufficient to capture handwriting that produces a legible ink impression on the record member.

28. The method as recited in claim 21, wherein the step of applying a writing comprises the substep of producing a legible ink impression on the record member using a pen.

29. The method as recited in claim 21, further comprising the steps of:
   clamping the record member to the surface to maintain the record member in place during movement of the surface; and
   guarding the digitizer from finger contact.

30. The method as recited in claim 21, wherein the record member has a reference mark.

31. The method as recited in claim 30, wherein the reference mark is a signature line.

32. The method as recited in claim 30, wherein the reference mark is a signature box.

33. The method as recited in claim 21, further comprising the step of:
   storing a roll of blank paper within the printer.

* * * * *